United States Patent
Larson et al.

(10) Patent No.: US 10,309,320 B2
(45) Date of Patent: Jun. 4, 2019

(54) METHOD FOR REGULATING A GAS TURBINE

(71) Applicant: Siemens Aktiengesellschaft, Munich (DE)

(72) Inventors: Marco Larson, Mülheim (DE); Nicolas Savilius, Essen (DE)

(73) Assignee: Siemens Aktiengesellschaft, Munich (DE)

( * ) Notice: Subject to any disclaimer, the term of this patent is extended or adjusted under 35 U.S.C. 154(b) by 347 days.

(21) Appl. No.: 15/111,477

(22) PCT Filed: Jan. 14, 2015

(86) PCT No.: PCT/EP2015/050524
§ 371 (c)(1),
(2) Date: Jul. 13, 2016

(87) PCT Pub. No.: WO2015/110320
PCT Pub. Date: Jul. 30, 2015

(65) Prior Publication Data
US 2016/0333798 A1 Nov. 17, 2016

(30) Foreign Application Priority Data

Jan. 22, 2014 (EP) .................................... 14152125

(51) Int. Cl.
*F02C 9/28* (2006.01)
*F02C 3/04* (2006.01)
*F02C 9/26* (2006.01)

(52) U.S. Cl.
CPC .................. *F02C 9/28* (2013.01); *F02C 3/04* (2013.01); *F02C 9/26* (2013.01); *F05D 2220/32* (2013.01);
(Continued)

(58) Field of Classification Search
CPC ........ F02C 9/26; F02C 9/28; F05D 2270/112; F05D 2270/14; F05D 2270/301;
(Continued)

(56) References Cited

U.S. PATENT DOCUMENTS 5,636,507 A 6/1997 Rajamani et al.
7,513,099 B2 * 4/2009 Nuding ................. F02C 7/1435
60/39.281

(Continued)

FOREIGN PATENT DOCUMENTS

EP     1331448 A2 *  7/2003  .............. F02C 7/228
EP     2239641 A2 * 10/2010  ............... F92C 9/00

(Continued)

OTHER PUBLICATIONS

JP Notice of Allowance dated Aug. 28, 2017, for JP patent application No. 2016-547880.

*Primary Examiner* — Andrew H Nguyen
*Assistant Examiner* — Stephanie Cheng
(74) *Attorney, Agent, or Firm* — Beusse Wolter Sanks & Maire

(57) ABSTRACT

A method for regulating a gas turbine wherein the fuel quantity supplied to the burners of the gas turbine is regulated using a target value for the corrected turbine outlet temperature. A stable operation of the gas turbine is to be allowed with a particularly high degree of efficiency and a high output at the same time. The target value for the corrected turbine outlet temperature is set using a value which characterizes the combustion stability in the burners, wherein the target value for the corrected turbine outlet temperature is set additionally using the surrounding temperature. Furthermore, the target value for the corrected turbine outlet temperature is set only below a specified surrounding temperature using the value which characterizes the combustion stability in the burners.

8 Claims, 2 Drawing Sheets

(52) U.S. Cl.
CPC ...... *F05D 2270/10* (2013.01); *F05D 2270/14* (2013.01); *F05D 2270/301* (2013.01); *F05D 2270/44* (2013.01)

(58) Field of Classification Search
CPC ....... F05D 2270/303; F05D 2270/3032; F05D 2270/313; F05D 2260/964; F23R 2900/00013
See application file for complete search history.

(56) References Cited

U.S. PATENT DOCUMENTS

| | | | |
|---|---|---|---|
| 7,707,814 B2* | 5/2010 | Sonoda | F02C 9/28 60/243 |
| 8,001,760 B2* | 8/2011 | Harada | F01K 23/10 60/39.182 |
| 9,328,669 B2* | 5/2016 | Rizkalla | G05B 15/02 |
| 9,665,077 B2* | 5/2017 | Jordan, Jr. | G05B 15/02 |
| 2009/0301097 A1 | 12/2009 | Deuker et al. | |
| 2010/0300108 A1 | 12/2010 | Demougeot et al. | |

FOREIGN PATENT DOCUMENTS

| | | |
|---|---|---|
| EP | 2239641 A2 | 10/2010 |
| EP | 2249008 A1 | 11/2010 |
| JP | 2002054460 A | 2/2002 |
| JP | 2008540911 A | 11/2008 |
| JP | 2010084523 A | 4/2010 |
| JP | 2012528277 A | 11/2012 |

* cited by examiner

METHOD FOR REGULATING A GAS TURBINE

CROSS REFERENCE TO RELATED APPLICATIONS

This application is the US National Stage of International Application No. PCT/EP2015/050524 filed Jan. 14, 2015, and claims the benefit thereof. The International Application claims the benefit of European Application No. EP14152125 filed Jan. 22, 2014. All of the applications are incorporated by reference herein in their entirety.

FIELD OF INVENTION

The invention relates to a method for regulating a gas turbine, in which the fuel quantity supplied to the burners of the gas turbine is regulated using a target value for the corrected turbine outlet temperature.

BACKGROUND OF INVENTION

A gas turbine is a continuous-flow machine in which a pressurized gas expands. It is composed of a turbine or expander, a compressor connected upstream and an intermediately connected combustion chamber. The principle of action is based on the cyclic process (Joule process): the latter compresses air by means of the blades of one or more compressor stages, subsequently mixes this in the combustion chamber with a gaseous or fluid propellant, and ignites and burns it.

This results in a hot gas (a mixture of combustion gas and air) which relaxes in the downstream turbine part, wherein the thermal energy is converted into mechanical energy and firstly drives the compressor. The remaining portion is used in the turboshaft engine to drive a generator, a propeller or other rotating consumers. In contrast, in the case of a jet engine the thermal energy accelerates the hot stream of gas, which generates the thrust.

The regulation of the fuel quantity of a fixed gas turbine during operation is usually carried out by means of a target value for the corrected turbine outlet temperature which is determined from the actual, measured outlet temperature. The object here is to keep the turbine inlet temperature largely constant as an important design variable of the gas turbine even under changing ambient conditions.

However, in the case of relatively low ambient temperatures and therefore relatively cool compressor air, the turbine inlet temperature and therefore also the turbine outlet temperature drop. The specified regulating process therefore increases the fuel quantity, as a result of which the primary zone temperature/combustion temperature in the combustion chamber increases. In the case of low external temperatures, this can cause this temperature to rise so far that it has a negative effect on the combustion stability. As a result, faults can occur during operation of the gas turbine.

In most cases, this problem has been solved by virtue of the fact that a characteristic curve (Cold Ambient Curve, CAC) was stored in the control unit of the gas turbine, said curve limiting or lowering the target value for the corrected turbine outlet temperature in the case of cold ambient temperatures, with the result that the rise in temperature in the combustion chamber is also limited. However, since as a result of this the turbine is no longer operated at the design point, the performance and efficiency of the turbine are reduced.

However, according to the teaching of EP2239641A2 there can also be provision to determine a target value for the corrected turbine outlet temperature by means of a logic circuit, wherein in order to calculate the decisive switching criterion a parameter which is characteristic of the combustion stability is taken into account. However, the switching logic requires continuous re-calculation of possibly different target values from which just one is subsequently used to control the gas turbine. This is very costly in terms of calculation technology since, in particular in the case of open-loop control, the possibility of combustion instability is continuously taken into account even in operating states of the gas turbine in which no combustion instability at all can occur owing to the operating conditions.

SUMMARY OF INVENTION

It is therefore an object of the invention to specify a method of the type mentioned at the beginning which permits stable operation of the gas turbine in an efficient way with a simultaneously particularly high efficiency level and high performance, while avoiding unnecessary expenditure in terms of control technology.

This object is achieved according to the invention in that the target value for the corrected turbine outlet temperature is determined using a value which is characteristic of the combustion stability in the burners, wherein the target value for the corrected turbine outlet temperature is additionally determined using the ambient temperature, and wherein the target value for the corrected turbine outlet temperature is determined only below a predefined ambient temperature using the value which is characteristic of the combustion stability in the burners.

The invention is based in this case on the idea that a particularly high efficiency level and a particularly high performance of the gas turbine could be achieved by virtue of the fact that the gas turbine is operated as close as possible at the design point despite fluctuating ambient conditions. However, in this connection, under all circumstances, a stable combustion must continue to be ensured. Although the previously stored characteristic curve for the corrected turbine outlet temperature in the case of low external temperatures ensures the stable combustion, in particular in specific operating states, the corrected turbine outlet temperature is lowered further here even though there is no risk at all of unstable combustion. This results from the fact that the corrected turbine outlet temperature is regulated independently of the actual combustion stability. In order to find the optimum compromise between combustion stability and performance as well as efficiency, a characteristic value for the combustion stability should therefore be formed, which is used to determine the target value for the corrected turbine outlet temperature.

According to the invention, the target value for the corrected turbine outlet temperature is also additionally determined using the ambient temperature. In other words: both the ambient temperature and the respectively used characteristic value for the combustion stability are used in the formation of the target value for the corrected turbine outlet temperature.

Furthermore, in this context the target value for the corrected turbine outlet temperature is determined only below a predefined ambient temperature using the value which is characteristic of the combustion stability in the burners. As long as the ambient temperature of the gas turbine is comparatively high, there is in fact no fear, owing to the design of the gas turbine, that the temperature in the combustion chamber rises so far that the combustion stability is endangered. Therefore, a limiting value for the ambient temperature can be provided, wherein the described process of regulating the target value for the corrected turbine outlet temperature using the value which is characteristic of the combustion stability in the burners intervenes only below this limiting value.

Therefore, the inventive solution also differs from the prior art which does not at all detect the ambient temperature as a reason for the occurrence of combustion instabilities.

In the invention, a thermal-acoustic variable is advantageously used during the determination of the value which is characteristic of the combustion stability in the burners. Here, use is made of the fact that flow instabilities of the burner flow which are expressed in coherent flow structures and which influence the mixture processes between the air and fuel generate thermal-acoustic vibrations. Therefore, the stability of the combustion can be inferred using the measurement of these thermal-acoustic vibrations.

In a particularly advantageous refinement of the method, the acceleration and/or the alternating pressure amplitude are used during the determination of the value which is characteristic of the combustion stability in the burners. Fluidic instability waves which are produced at the burner lead, in fact, to the formation of eddies which strongly influence the entire combustion process and lead to undesired periodic releases of heat within the combustion chamber, which are associated with strong fluctuations in pressure. High vibration amplitudes are linked to the high fluctuations in pressure and can therefore be used as a direct indicator of the combustion stability. High alternating pressure amplitudes and accelerations signify a high level of instability of the combustion.

The regulating process also advantageously takes place in such a way that a limiting value for the value which is characteristic of the combustion stability in the burners is predefined, and the target value for the corrected turbine outlet temperature is lowered when the limiting value is undershot. This ensures that a predefined limit for the combustion stability is never undershot.

In a further advantageous refinement of the method, the target value for the corrected turbine outlet temperature is determined in the partial load mode using the value which is characteristic of the combustion stability in the burners. The previously used fixed characteristic curve for the target value of the corrected turbine outlet temperature applies as a function of the ambient temperature, specifically both in the case of a basic load as well as in the case of a partial load. However, the absolute combustion temperature and therefore the risk of combustion instabilities is lower than in the case of the basic load. The regulating process using the value which is characteristic of the combustion stability is therefore particularly effective, in particular in the partial load mode, since here the previously used regulating process intervenes even if there was no need at all for the reduction in the turbine outlet temperature with respect to the combustion stability.

A control unit for a gas turbine is advantageously configured to carry out the method described. It therefore comprises corresponding inputs for the respective necessary sensors, i.e. pressure sensors and acceleration sensors and a corresponding regulating electronic system or regulating software by means of which the method features can be implemented.

A gas turbine advantageously comprises such a control unit.

A power plant advantageously comprises such a gas turbine.

The advantages achieved with the invention comprise, in particular, the fact that by determining or modifying the target value for the corrected turbine outlet temperature directly using a limiting value which is characteristic of the combustion stability, such as for example thermal-acoustic variables, optimum performance and optimum efficiency of the gas turbine are always achieved even in the partial load mode even in the case of low ambient temperatures. The performance and efficiency can be kept at their maximum possible values in every operating state and only the absolutely necessary disadvantageous effects have to be accepted in order to maintain the combustion stability.

BRIEF DESCRIPTION OF THE DRAWINGS

An exemplary embodiment of the invention is explained in detail with reference to a drawing, in which.

DETAILED DESCRIPTION OF INVENTION

Identical parts are provided with the same reference symbols in all the figures.

Figure 1:
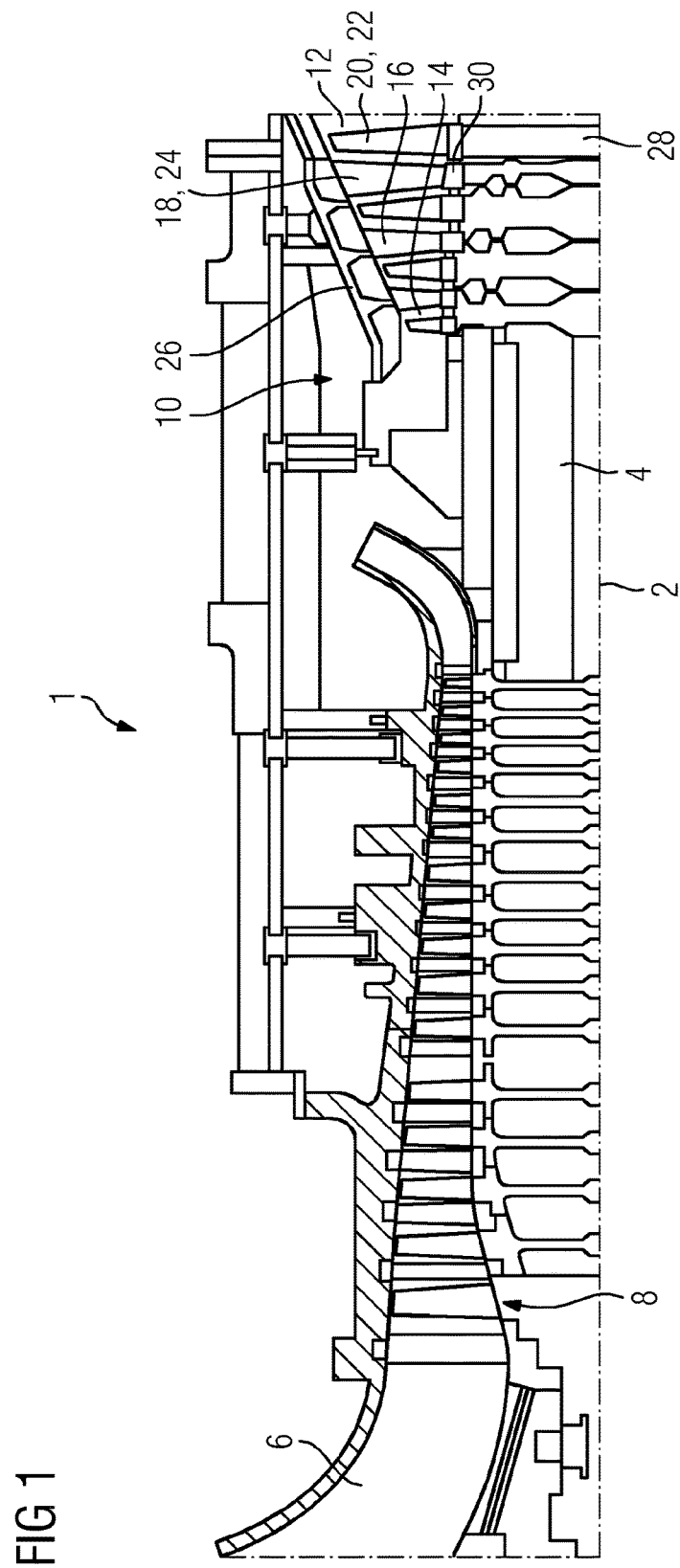
FIG. 1 shows a partial longitudinal section through a gas turbine.

FIG. 1 shows a gas turbine 1 in a longitudinal partial section. The partial section shows only the upper half of the gas turbine 1. The gas turbine 1 has in its interior a rotor 4 which is mounted so as to be rotatable about a rotational axis 2 (axial direction) and is also referred to as a turbine rotor. Following successively one after the other along the rotor 4 are firstly an intake housing 6 and a compressor 8. The air is conducted from the outlet of the compressor 8 in to two silo combustion chambers 10, which are illustrated only generally in FIG. 1 and are not presented in more detail below. The silo combustion chamber 10 is followed by a turbine 12 and the exhaust gas housing which is not illustrated further.

Although the method which is illustrated below is explained with reference to a gas turbine 1 with silo combustion chambers 10, it can be applied equally well in gas turbines 1 with combustion chambers which are configured differently. The following statements therefore also apply to gas turbines 1 with, for example, an annular, tubular or annular/tubular combustion chamber.

The silo combustion chambers 10 communicate with an annular hot gas duct 14 in the turbine 12. There, for example four turbine stages 16 which are connected one behind the other form the turbine 12. Each turbine stage 16 is formed from two blade rings. Viewed in the direction of flow of a working medium, a guide vane series 18 formed from guide vanes 24 is followed in the hot gas duct 14 by a rotor blade series 22 formed from rotor blades 20. The guide vanes 24 of the guide vane series 18 and the rotor blades 20 have a slightly curved profile, similar to an aircraft wing.

The guide vanes 24 are attached here to the stator 26. Each guide vane 24 has, in addition to the actual blade leaf, a guide vane foot, also referred to as a platform, and a guide vane head lying opposite the guide vane foot. The guide vane head faces the rotor 4 and is attached to an inner ring 30. Each inner ring 30 encloses the shaft of the rotor 4 here. Each rotor blade 20 also has such a rotor blade foot but it ends in a rotor blade tip.

The rotor blades 20 of a rotor blade series 22 are attached to the rotor 4 by means of one turbine disk 28 in each case. The rotor blades 20 therefore form components of the rotor 4. A generator or a machine (not illustrated) is coupled to the rotor 4.

During the operation of the gas turbine 1, air is sucked in and compressed by the compressor 8 through the intake housing 6. The compressed air which is made available at the turbine-side end of the compressor 8 is guided into the silo combustion chambers 10 and mixed there with a burning medium. The mixture is then burnt in the silo combustion chambers 10 to form a hot gas. The hot gas flows from the silo combustion chambers 10 along the hot gas duct 14 past the guide vanes 24 and the rotor blades 20.

A portion of the internal energy of the fluid flow is extracted by the as far as possible eddy-free laminar flow around the turbine blades 20, 24 and passed onto the rotor blades 20 of the turbine 12. The rotor 4 is then made to rotate by said energy, as a result of which firstly the compressor 8 is driven. The usable power is output to the machine (not illustrated).

Figure 2:
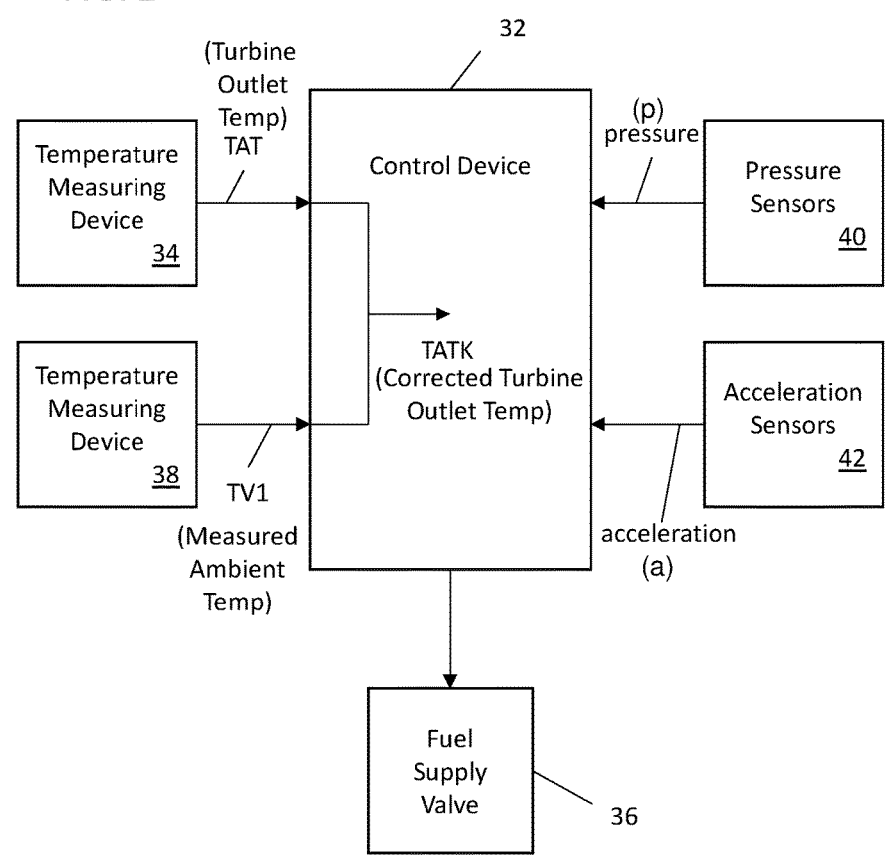
FIG. 2 shows a schematic illustration of a method for regulating the gas turbine.

FIG. 2 now shows in a schematic form the function of the process of regulating the gas turbine which takes place in a control unit 32. The design objective here is to keep the turbine inlet temperature or ISO mixture temperature TT1iso constant. This temperature TT1iso of the hot gas which prevails in the ideal state at the entry to the turbine 12 cannot be measured directly. It corresponds at approximately to the combustion chamber outlet temperature minus the temperature losses as a result of the mixing of the cooling air and leakage air, wherein in theory complete mixing is assumed.

In order to regulate the operation of the gas turbine 1, the turbine outlet temperature TAT of the hot gas at the outlet of the turbine 12 is therefore monitored by means of a temperature measuring device 34. Both the performance of the gas turbine 1 and the turbine outlet temperature TAT, and therefore indirectly the turbine inlet temperature TT1iso, can be regulated by means of the quantity of the introduced fuel into the silo combustion chamber 10. An increase in the volume flow of the burning medium into the gas turbine 1 brings about a higher temperature of the hot gas and an increase in the performance of the gas turbine 1. For this purpose, the control device 32 regulates the fuel supply valve 36.

Since the turbine inlet temperature TT1 is also dependent on the ambient temperature TV1 of the sucked-in air flow upstream of the compressor 8, the latter is also detected or determined continuously, i.e. during the entire operating period in a cyclically recurring fashion by means of the temperature measuring device 38.

The dependence of the turbine outlet temperature TAT on the air temperature TV1 is largely eliminated by means of the control device 32 in that a corrected turbine outlet temperature TATK is determined according to TATK=TAT−k·TV1 as an auxiliary variable. The corrected turbine outlet temperature TATK is accordingly largely dependent on the use of the burning medium, with the result that the gas turbine 1 can more easily be regulated by regulating the corrected turbine outlet temperature TATK as a regulated variable and with the setting of the volume flow of the burning medium as a manipulated variable. The corrected turbine outlet temperature TATK can also be determined using a quadratic equation or using other functions.

Depending on the ambient temperature, a target value Tsoll of the corrected turbine outlet temperature TATK can be set and determined in the control unit 32. However, determination is to be carried out here only below a predefined ambient temperature using the value which is characteristic of the combustion stability in the burners. In such a case, the comparison of the target value Tsoll with the determined corrected turbine outlet temperature TATK is carried out. If the actual value, the corrected turbine outlet temperature TATK, is lower—higher—than the target value Tsoll, the control unit 32 increases—reduces—the supply of burning medium to the silo combustion chamber 10 via the fuel supply valve 36.

When the ambient temperatures TV1 fall, the turbine inlet temperature TT1iso drops, since the compressor air is cooler and therefore the hot gas is supplied with cooler cooling air and leakage air. However, the turbine outlet temperature TAT and—despite the correction which is made—the corrected turbine outlet temperature TATK therefore also fall, with the result that the described regulating process increases the supply of fuel. This increases the combustion temperature in the silo combustion chamber 10, with the result that under certain circumstances the combustion can become unstable as a result of oscillations. The target value Tsoll for the corrected turbine outlet temperature TATK therefore has to be lowered in the case of low external temperatures TV1.

In addition to the relationships illustrated above, the formula for the TATK also includes further input variables such as for example the rotational speed of the gas turbine 1 and the humidity in the air.

The gas turbine then additionally has pressure sensors 40 and acceleration sensors 42 in the silo combustion chamber 10. These can also be present within the scope of the "Advanced Stability Margin Controller (aSMC)" introduced by the applicant, and in each case they measure the thermal-acoustic measurement variables of the acceleration a and the alternating pressure amplitude p. These serve to determine a characteristic value W for the combustion stability.

The determination of the target value Tsoll of the corrected turbine outlet temperature TATK is then carried out in the case of low ambient temperatures TV1 (a specific limiting value can be predefined here) on the basis of the determined characteristic value W or directly using an algorithm from the measured values for the acceleration a and the alternating pressure amplitude p. Essentially, in this context the target value Tsoll is reduced as soon as the combustion stability undershoots a specific limiting value. The target value Tsoll therefore always remains as high as possible, but as low as necessary, in order to avoid instabilities of the combustion. The target value Tsoll is therefore regulated using the determined combustion stability.

As a result, the performance and the efficiency of the gas turbine 1 are optimized, in particular in the partial load mode and in the case of low external temperatures.

The invention claimed is:

1. A method for regulating a gas turbine, the method comprising:
    determining a corrected turbine outlet temperature as a function of a measured ambient temperature,
    determining, only when the measured ambient temperature is less than a predefined ambient temperature, a target temperature for the corrected turbine outlet temperature by using a value which is characteristic of the combustion stability in burners of the gas turbine and the measured ambient temperature; and
    regulating a fuel quantity supplied to the burners of the gas turbine based on the target temperature, wherein when the corrected turbine outlet temperature is less than the target temperature, increasing the fuel quantity supplied to the burners of the gas turbine, wherein when the corrected turbine outlet temperature is greater than the target temperature, decreasing the fuel quantity supplied to the burners of the gas turbine.

2. The method as claimed in claim 1, wherein a thermal-acoustic variable is used during the determination of the value which is characteristic of the combustion stability in the burners of the gas turbine.

3. The method as claimed in claim 1, wherein an acceleration and/or an alternating pressure amplitude are used during the determination of the value which is characteristic of the combustion stability in the burners of the gas turbine.

4. The method as claimed in claim 1, wherein a limiting value for the value which is characteristic of the combustion stability in the burners of the gas turbine is predefined, and the target temperature for the corrected turbine outlet temperature is lowered when the limiting value is undershot.

5. The method as claimed in claim 1, wherein the target temperature for the corrected turbine outlet temperature is determined in a partial load mode using the value which is characteristic of the combustion stability in the burners of the gas turbine.

6. A control unit for a gas turbine, wherein the control unit is configured to carry out a method comprising:
   determining a corrected turbine outlet temperature as a function of a measured ambient temperature,
   determining, only when the measured ambient temperature is less than a predefined ambient temperature, a target temperature for the corrected turbine outlet temperature by using a value which is characteristic of the combustion stability in burners of the gas turbine and the measured ambient temperature; and
   regulating a fuel quantity supplied to the burners of the gas turbine based on the target temperature, wherein when the corrected turbine outlet temperature is less than the target temperature, increasing the fuel quantity supplied to the burners of the gas turbine, wherein when the corrected turbine outlet temperature is greater than the target temperature, decreasing the fuel quantity supplied to the burners of the gas turbine.

7. A gas turbine comprising:
   the control unit as claimed in claim 6.

8. A power plant comprising:
   the gas turbine as claimed in claim 7.

\* \* \* \* \*